(12) United States Patent
Kordtomeikel

(10) Patent No.: US 12,025,099 B2
(45) Date of Patent: Jul. 2, 2024

(54) WIND TURBINE BLADE PITCH SYSTEM

(71) Applicant: Beckhoff Automation GmbH, Verl (DE)

(72) Inventor: Dirk Kordtomeikel, Wangels (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/068,427

(22) Filed: Oct. 12, 2020

(65) Prior Publication Data

US 2021/0040933 A1 Feb. 11, 2021

Related U.S. Application Data

(63) Continuation of application No. PCT/EP2019/067058, filed on Jun. 26, 2019.

(30) Foreign Application Priority Data

Jun. 28, 2018 (DE) ......................... 102018115587.5

(51) Int. Cl.
F03D 7/02 (2006.01)
(52) U.S. Cl.
CPC ........ *F03D 7/0224* (2013.01); *H02J 2300/28* (2020.01)
(58) Field of Classification Search
None
See application file for complete search history.

(56) References Cited

U.S. PATENT DOCUMENTS

| | | | |
|---|---|---|---|
| 9,086,048 B2 * | 7/2015 | Roesmann | ............ F03D 7/0224 |
| 9,297,360 B2 * | 3/2016 | Bertolotti | .............. F03D 7/0244 |
| 9,897,072 B2 | 2/2018 | Vetter et al. | |

(Continued)

FOREIGN PATENT DOCUMENTS

| | | |
|---|---|---|
| CN | 102062057 A | 5/2011 |
| CN | 102459887 A | 5/2012 |
| DE | 3642724 A1 | 6/1988 |

(Continued)

OTHER PUBLICATIONS

"AMP8000 decentralized servo drive system: decentralized servo drives for modular machines," downloaded Sep. 30, 2020 from https://www.beckhoff.de/german/drive_technology/amp8000.htm?id=347 1194472722, 5 pages including English machine translation.

(Continued)

*Primary Examiner* — Justin D Seabe
*Assistant Examiner* — John S Hunter, Jr.
(74) *Attorney, Agent, or Firm* — Dorsey & Whitney LLP

(57) ABSTRACT

A wind-turbine-blade-pitch system for a wind turbine comprises at least one electric motor which can be configured to be addressed by an inverter. The inverter can be configured to be addressed by a rectifier. The rectifier and the inverters are configured to be arranged locally separated from each other in the wind-turbine-blade-pitch system. The power distribution device and at least one power-storage system are connected via one or more electrical supply lines. The power distribution device can be configured to supply the at least one electric motor with electrical energy from the power storage system, via the one or more electrical supply lines.

16 Claims, 6 Drawing Sheets

(56) References Cited

U.S. PATENT DOCUMENTS 11,002,248 B2 *  5/2021  Hammerum .......... F03D 7/0224

FOREIGN PATENT DOCUMENTS

| DE | 10335575 A1 * | 3/2005 | ........... F03D 7/0224 |
|---|---|---|---|
| DE | 102009044570 A1 | 5/2011 | |
| DE | 102010036358 A1 | 1/2012 | |
| DE | 102014114129 A1 | 3/2016 | |
| DE | 102014114787 B4 * | 5/2017 | ................ F03B 3/06 |
| EP | 2637300 A1 | 9/2013 | |
| EP | 2878808 A1 | 6/2015 | |

OTHER PUBLICATIONS

"Decentralized servo drives for modular machine concepts," elecktrotechnik & automation, S1/2018, www.etz.de, 11 pages including English machine translation.

Office Action dated Jun. 16, 2021 in connection with Chinese patent application No. 201980043381.2, 9 pages including English translation.

"EtherCAT—the Ethernet Fieldbus," EtherCAT Technology Group, Nov. 2012, 21 pages.

\* cited by examiner

WIND TURBINE BLADE PITCH SYSTEM

CROSS-REFERENCE TO RELATED APPLICATIONS

The present patent application is a continuation of International Patent Application PCT/EP2019/067058, filed Jun. 26, 2019, entitled WIND TURBINE BLADE ADJUSTMENT SYSTEM, and German patent application DE 10 2018 115 587.5, filed Jun. 28, 2018, entitled WINDKRAFTANLAGENBLATTVERSTELLSYSTEM, each of which is incorporated by reference herein, in the entirety and for all purposes.

FIELD

The present invention relates to a wind-turbine-blade-pitch system. The present invention further relates to a wind-turbine.

BACKGROUND

DE 2010 036 358 A1 discloses a blade-pitch-control drive for a wind turbine, wherein a converter is arranged or flanged to a motor of the blade-pitch-control drive. As a so-called full converter, the converter has an input stage and an output stage, wherein a converter control can be attached to the motor. An emergency power-supply system can be integrated into a DC intermediate circuit, which is formed between the input and output stage.

DE 3642724 A1 discloses an electric motor having an integrated frequency converter. The frequency converter comprises an input circuit and an output circuit. It is disclosed that in one variant the input circuit may also be arranged externally.

DE 10 2014 114 129 A1 discloses an alternating current motor with an inverter arranged thereto.

AC motors, especially asynchronous motors, are generally more powerful and cheaper than DC motors. In the following, an alternating current motor is always referred to as an "electric motor."

SUMMARY

The present invention provides an improved blade-pitch system for a wind turbine.

According to a first aspect, a wind-turbine-blade-pitch system comprises at least one electric motor which can be addressed by an inverter. The inverter can be addressed by a rectifier. The rectifier and the inverter in the wind-turbine-blade-pitch system are arranged separately from each other.

According to a first aspect, a wind-turbine-blade-pitch system comprises a plurality of electric motors each assigned to a rotor section, wherein each electric motor is embodied to adjust a rotor blade of the corresponding rotor section. The wind-turbine-blade-pitch system further comprises a plurality of inverters each assigned to an electric motor, wherein each inverter is embodied to drive the corresponding electric motor. The wind-turbine-blade-pitch system further comprises a plurality of power-storage systems each assigned to an inverter, wherein each power-storage system is embodied to supply the corresponding inverter with electrical energy in case of a power failure. The wind-turbine-blade-pitch system further comprises a rectifier which is locally separated from the inverters and is embodied to supply the inverters with direct current via a distribution device, wherein the distribution device is connected to each power-storage system and is embodied to supply the inverters with electrical energy from the connected power-storage system in case of a power failure.

EMBODIMENTS

In a wind-turbine-blade-pitch system, the rectifier and the inverter are arranged locally separated from each other. This eliminates the need for a switch cabinet for a single rotor blade or, respectively, the wind-turbine-blade-pitch system. The rectifier is to a certain extent centralized and can be used to supply energy to the remotely located electric motor. In this way, installation space in the wind turbine may advantageously be saved, wherein a DC-intermediate circuit is formed between the rectifier and the inverter.

The inverter of the wind-turbine-blade-pitch system is arranged in the electric motor. This makes it possible to use the electric motor as a modular, decentralized servo-drive system in which the central rectifier acts as a feed-in and coupling module.

The wind-turbine-blade-pitch system has a plurality of electric motors, each with an inverter assigned to the respective electric motor and arranged in the respective electric motor, wherein the inverters can be addressed by the rectifier via a distribution device. Advantageously, this allows for controlling all rotor blades of the wind turbine, which supports safe and optimized operation of the wind turbine.

The electric motors of the wind-turbine-blade-pitch system can be energetically supplied from at least one power-storage system. This means that even in the event of a power failure, a rotor blade of the wind turbine can be adjusted in such a way that the entire wind turbine can be safely deactivated.

Each electric motor of the wind-turbine-blade-pitch system is assigned at least one power-storage system, wherein each electric motor can be supplied by its assigned power-storage system. The advantage of this is that redundancy is provided which further increases the reliability of the wind-turbine operation. If, for example, due to a short-circuit, a single power-storage system no longer has sufficient electrical power to operate the assigned electric motor, at least another electric motor of the assigned power-storage system can be operated in the event of a power failure and the associated rotor blade of the wind turbine can be rotated or, respectively, adjusted in relation to the wind in such a way that the wind turbine is safely braked or, respectively, deactivated.

Each electric motor of the wind-turbine-blade-pitch system can be supplied with power from at least one other power-storage system assigned to one of the electric motors via a distribution device. In this way, each electric motor can be energetically fed from any power-storage system, which further improves the reliability of the wind turbine.

The distribution device of the wind-turbine-blade-pitch system is located internally or externally of the rectifier. This allows an optimized use of the installation space within the wind turbine.

The at least one inverter of the wind-turbine-blade-pitch system is connected to the rectifier via a line assigned to the at least one inverter, via which electrical power and data can be transmitted. This provides that the electric motor may not only be energetically but also logically addressed by only one line, which supports an installation space-optimized assembly and an optimized operation of the wind turbine.

A slip ring of the wind-turbine-blade-pitch system is arranged in a hub or in a pod of the wind turbine, wherein electrical power and/or data for the wind-turbine-blade-pitch system can be transmitted by the slip ring. Advantageously, this provides different technical possibilities of implementation, wherein the advantage of placing the slip ring inside of the pod is that the central rectifier is exposed to more favorable environmental conditions than in the hub.

The at least one inverter of the wind-turbine-blade-pitch system has a current controller. This advantageously supplies the electric motor with optimal electric current. In a wind-turbine-blade-pitch system having a plurality of electric motors, a plurality of or all of the electric motors may also have a current regulator.

The at least one inverter of the wind-turbine-blade-pitch system has a speed controller. This supports an even further improved operation of the wind turbine. In a wind-turbine-blade-pitch system having a plurality of electric motors, a plurality of or all of the electric motors may have a speed controller.

The at least one inverter of the wind-turbine-blade-pitch system has a position controller. This advantageously provides an optimal position of the rotor blades during the operation of the wind turbine. In a wind-turbine-blade-pitch system having a plurality of electric motors, a plurality of or all of the electric motors may have a position controller.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In a wind-turbine-blade-pitch system, the rectifier and the inverter are arranged locally separated from each other. This results in the fact that in a DC intermediate circuit between the rectifier and the inverter only electrical direct current is transmitted and that a switch cabinet is not necessary for a full converter because there is no full converter present. A switch cabinet may only be required for an electrical storage system, although this will be much smaller and more cost-effective. In this way, the rectifier is to a certain extent "centralized" and may be used to feed all electric motors of the wind-turbine-blade-pitch system.

Figure 1:
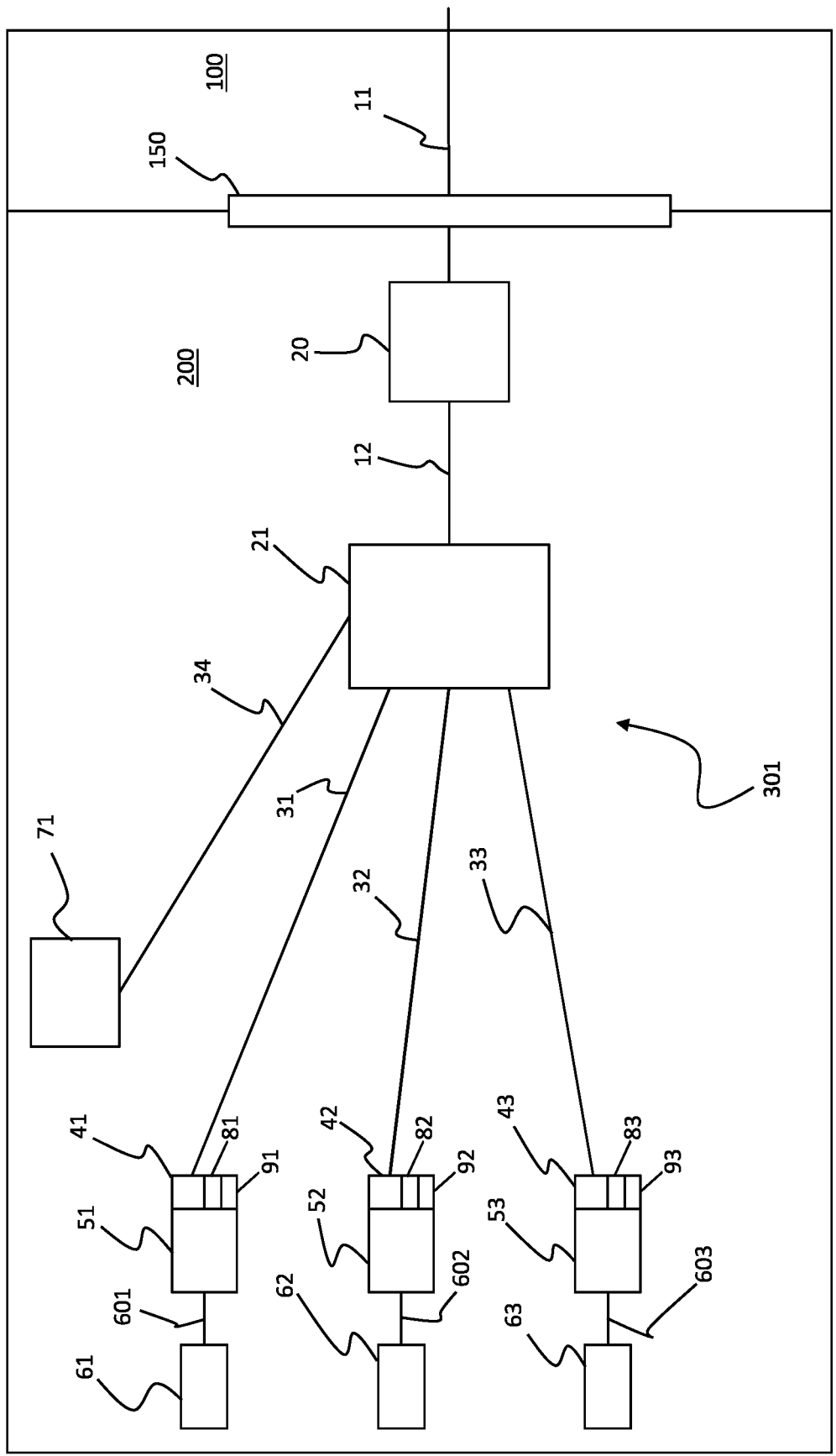
FIG. 1 depicts the principle of a first embodiment of the wind-turbine-blade-pitch system according to the invention.

FIG. 1 shows a basic overview block diagram of a first embodiment of a wind-turbine-blade-pitch system 301 according to the invention, wherein the inventive wind-turbine-blade-pitch system 301 is arranged within a hub 200 and a pod 100 of a wind turbine. A central rectifier 20 is supplied with electrical power in the form of electrical alternating current by a feed line 11 through an electrical supply network.

The feed line 11 leads from the pod 100 to the hub 200 via a first slip ring 150. The central rectifier 20 converts the electric alternating current into an electric direct current. Via a further supply line 12, the electrical direct current is transferred from the central rectifier 20 to a first distribution device 21. In addition to the electrical power, the electrical supply line 12 may also optionally transmit data, which may be realized using an industrial field-bus system. Preferably, the supply line 12 is an ETHERCAT P® line, however, other lines for transmitting suitable industrial field-bus protocols (e.g. PROFIBUS®, CANOPEN®, etc.) may also be used for transmitting data.

The central rectifier 20 may be controlled via a superordinate control system. Alternatively, it is also conceivable that the first distribution device 21 is mechanically and/or functionally integrated into the central rectifier 20. In other embodiments, the respective distribution device devices may be integrated mechanically and/or functionally into the central rectifier 20.

It can be seen that a first line 31 connects the first distribution device 21 with a first inverter 41. The first line 31 is thus assigned to the first inverter 41. The first inverter 41 is arranged at a first electric motor 51 to drive it. The inverter 41 is preferably arranged inside of the electric motor 51.

The design of the electric motor 51 is modular and may be carried out in cascades with a feed-in and coupling module, a distribution module and decentralized servo drives, wherein the feed-in and coupling module is represented by the central rectifier 20.

By the first electric motor 51, a first mechanical shaft 601 may be driven, wherein the first mechanical shaft 601 is operatively connected to a first rotor section 61. The first rotor section 61 comprises two encoders, a gearbox and a rotor blade. Due to prescribed guidelines for wind turbines, two encoders must be used in wind-turbine-blade-pitch systems, with a first encoder of the first rotor section 61 positioned in front of the gearbox and a second encoder of the first rotor section 61 positioned behind the gearbox. The two rotary encoders of the first rotor section 61 are, in terms of communication, connected to a position controller and/or a speed controller of the first inverter 41.

Alternatively, the two encoders of the first rotor section 61 may for communication purposes be connected to the central controller of a superordinate controller. The gearbox is mechanically connected to the rotor blade. If the first mechanical shaft 601 is driven by the electric motor 51, the rotor blade of the first rotor section 61 is moved or, respectively, adjusted.

In analogy to the connection of the first electric motor 51 to the distribution device 21, a second mechanical shaft 602 may be operatively connected to a second rotor section 62 and driven by a second electric motor 52, which is connected to a second inverter 42 via a second line 3Z and a third mechanical shaft 603 may be operatively connected to a third rotor section 63 and driven by a third electric motor 53, which is connected to a third inverter 43 via a third line 33, as shown in FIG. 1.

An electrical power-storage system 71 (which may e.g. include batteries, accumulators and/or capacitors) connected to the first distribution device 21 may also be recognized, which may provide an emergency power supply for the first, second and/or third electric motors 51, 52, 53 in the event of a power failure of the electrical supply network, in order to turn or position the associated rotor blade of the wind turbine in relation to the wind in such a way that the wind turbine is safely braked or, respectively, deactivated.

The first, second and third line 31, 32, 33 may additionally provide a data transmission, wherein the first, second and third line 31, 32, 33 are moreover particularly embodied as ETHERCAT-P® lines.

The first, second and third inverters 41, 42, 43 are each locally separated from the first distribution device 21. The first power-storage system 71 may likewise be arranged spatially separate from the first distribution device 21.

The first inverter 41 is designed to control the first electric motor 51. For this purpose, the first inverter 41 converts the electric direct current into an electric alternating current by full or half bridges. The first inverter 41 and the first electric motor 51 form a physical unit and are arranged in close proximity to each other.

The circuitry and mode of operation of the second electric motor 52 and the third electric motor 53 are analogous to the circuitry and mode of operation of the first electric motor 51.

Preferably, at least one of the first, second and/or third inverters 41, 42, 43 has an additional position controller and/or a speed controller 81, 82, 83. Preferably at least one of the first, second and/or third inverters 41, 42, 43 has a position controller and/or a speed controller 81, 82, 83. Preferably, at least one of the first, second and/or third inverters 41, 42, 43 also has a current controller 91, 92, 93, which ensures that the first, second or third electric motor 51, 52, 53 controlled by the first, second or third inverter 41, 42, 43 is supplied with suitable or, respectively, optimized electric current. This makes it possible that the full or half bridges of the first, second and third inverters 41, 42, 43 do not have to be controlled by a central controller in a superordinate control system.

The first, second and third inverters 41, 42, 43 preferably each comprise a field-bus connection for data communication. In the embodiment of the wind-turbine-blade-pitch system 301 of FIG. 1, the field bus connection of the first, second and third inverters 41, 42, 43 is connected to the respective first, second and third line 31, 32, 33, since the first, second and third line 31, 32, 33 may provide both data and electrical power transmission, as described above.

The first, second and third electric motors 51, 52, 53 are preferably asynchronous motors.

The first power-storage system 71 is designed to store electrical power. For reasons of prescribed redundancy, the first power-storage system 71 consists of two power-storage elements. The first power-storage system 71 may be charged or discharged by its own control unit or by the superordinate controller. The power-storage elements of the first power-storage system 71 e.g. include accumulators and/or capacitors, particularly so-called supercapacitors. The first power-storage system 71 is an essential component of an emergency power supply system (backup system).

If no more electrical power is transmitted via the feed-in line 11 or the supply line 12, at least one rotor blade of the wind turbine must be adjusted in such a way that the hub 200 of the wind turbine is no longer driven by the wind. For this purpose, it is usually sufficient to adjust only a single rotor blade of the wind turbine by an electric motor, although in practice all rotor blades of the wind turbine are adjusted for safety reasons.

The first power-storage system 71 is embodied in such a way that, in the exceptional case described above, sufficient electrical energy may be provided to adjust all rotor blades of the wind turbine. The first power-storage system 71 or the fourth line 34 or the first distribution device 21 has a separating device to electrically separate the first power-storage system 71 from the electrical distribution device 21. This is e.g. necessary to protect a first power-storage system 71 embodied as a battery, which has been fully charged via a corresponding circuit, from unwanted discharge by the first, second and/or third electric motor 51, 52, 53 during operation of the wind turbine. However, as soon as, in an exceptional case, the electrical supply of the first, second and/or third electric motor 51, 52, 53 via the converter 20 is no longer available, the separating device is automatically closed so that the first, second and/or third electric motor 51, 52, 53 may be operated as described using the first power-storage system 71.

In this way, the first, second and third inverters 41, 42, 43, the first, second, third and fourth lines 31, 32, 33, 34, the first distribution device 21 and the power-storage system 71 form a shared DC-intermediate circuit. The electrical intermediate circuit voltage of the above-mentioned DC intermediate circuit may in particular be approx. 565 V to approx. 680 V.

The first distribution device 21 may include an intermediate-circuit capacity of the DC intermediate circuit, wherein a value of the intermediate-circuit capacity for smoothing the direct current may amount to e.g. 1120 µF.

The components of the aforementioned first embodiment of the wind-turbine-blade-pitch system 301 of FIG. 1 may be centrally controlled by a superordinate control system.

Figure 2:
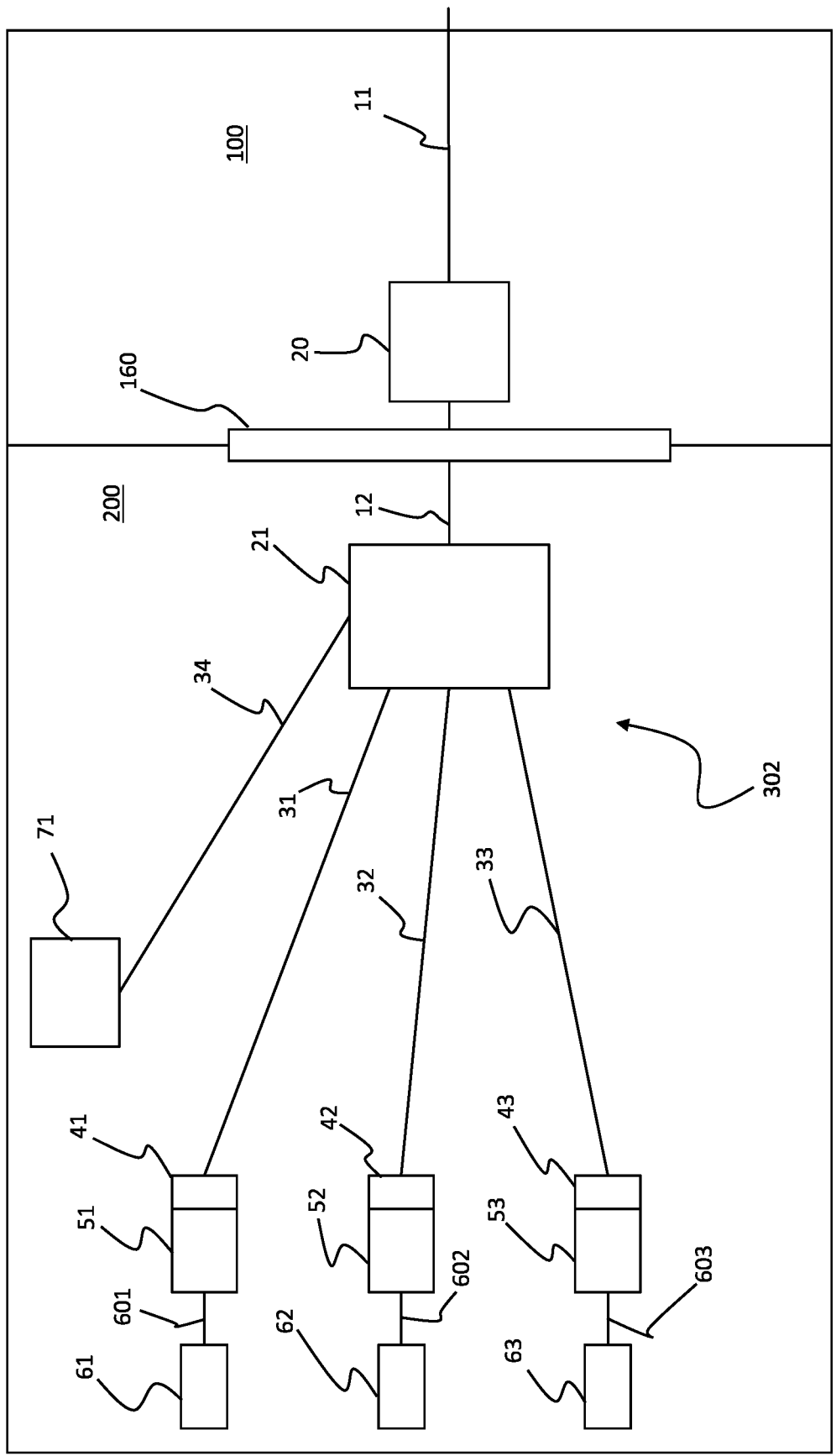
FIG. 2 shows a principle of a second embodiment of the wind-turbine-blade-pitch system according to the invention.

FIG. 2 shows a block diagram of a second embodiment 302 of the proposed wind-turbine-blade-pitch system 301 for a wind turbine. Essential components are identical to the first embodiment 301 according to FIG. 1. The central rectifier 20 is located inside the pod 100 in this variant. This ensures that the central rectifier 20 is not exposed to the difficult environmental conditions inside the hub 200. The housing of the central rectifier 20 may therefore be advantageously weaker in its embodiment and thus more cost-efficient. In the second embodiment of the wind-turbine-blade-pitch system 302, it is advantageously not necessary for the supply line 11 to have a first slip ring 150, because instead the electrical supply line 12 has a second slip ring 160, via which direct current is fed from rectifier 20 to the first distribution device 21.

An arrangement of the components described in connection with the second embodiment 302 of the proposed wind-turbine-blade-pitch system 301 in the pod 100 or the hub 200 is of course also conceivable and possible with the third, fourth and fifth embodiments of the wind-turbine-blade-pitch system 303, 304, 305, so that the spatial allocation of the components to pod 100 and hub 200 is not limited to the second embodiment 302 of the wind-turbine-blade-pitch system 301. This applies in particular to the spatial arrangement of the central rectifier 20.

Figure 3:
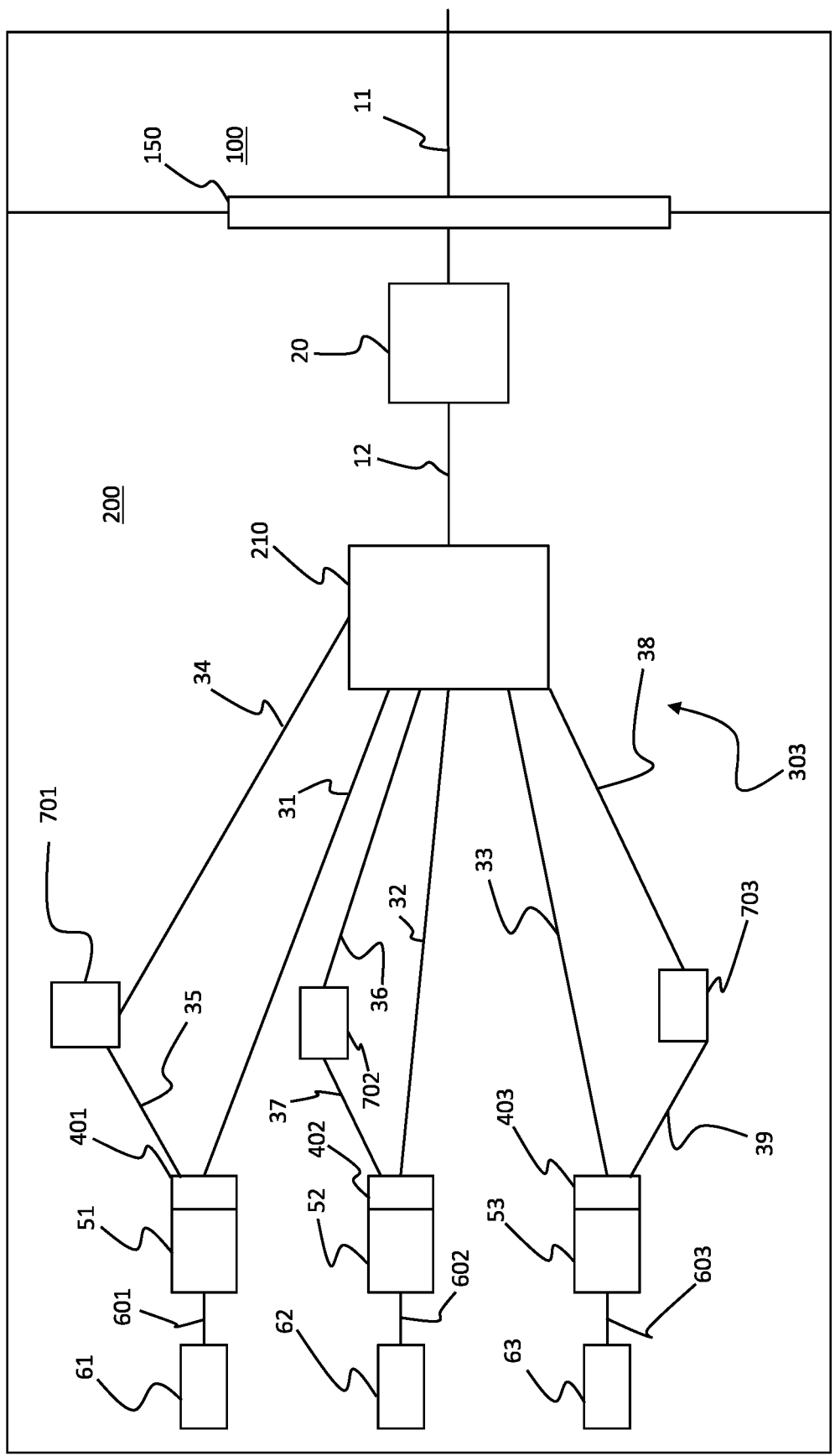
FIG. 3 shows a principle of a third embodiment of the wind-turbine-blade-pitch system according to the invention.

FIG. 3 shows a block diagram of a third embodiment 303 of a proposed wind-turbine-blade-pitch system 301 for a wind turbine. The third embodiment 303 is very similar to the first embodiment of the wind-turbine-blade-pitch system 301 of FIG. 1. Essential components of it are also included in the third embodiment and are therefore differences are explained in the following.

Instead of the first distribution device 21, a second distribution device 210 may be seen. The second distribution device 210 is functionally comparable to the first distribution device 21. Compared to the first distribution device 21, the second distribution device 210 additionally comprises a connection for a sixth line 36 and additionally a connection for an eighth line 38.

The first line 31 functionally connects the second distribution device 210 to a fourth inverter 401 and is thus assigned to it. The second line 32 functionally connects the second distribution device 210 to a fifth inverter 402 and is thus assigned to it. The third line 33 functionally connects the second distribution device 210 with an inverter 403 and is thus assigned to it.

The fourth line 34 functionally connects the second distribution device 210 to a second power-storage system 701. The sixth line 36 functionally connects the second distribution device 210 to a third power-storage system 702. The eighth line 38 functionally connects the second distribution device 210 to a fourth power-storage system 703. A fifth line 35 functionally connects the second power-storage system 701 to the fourth inverter 401. A seventh line 37 functionally connects the third power-storage system 702 to the fifth inverter 402. A ninth line 39 functionally connects the fourth power-storage system 703 to the sixth inverter 403.

The first to ninth line 31 . . . 39 of the third version of the wind-turbine-blade-pitch system 303 transmit electrical direct current to the fourth, fifth and sixth inverters 401, 402, 403 or, respectively, to at least one second, at least one third and at least one fourth power-storage system 701, 702, 703. The first to ninth line 31 . . . 39 may provide an additional data connection between the components mentioned, which is possible in particular by embodying the lines mentioned as ETHERCAT P® lines.

The difference between the fourth inverter 401 and the first inverter 41 of FIG. 1 is that the fourth inverter 401 has two connections: one connection for the first line 31 and one connection for the fifth line 35. The fourth inverter 401 forms a structural unit with the first electric motor 51. Functionally, the fourth 401 inverter and the first 41 inverter do not differ from each other.

The difference between the fifth inverter 402 and the second inverter 42 of FIG. 1 is that the fifth inverter 402 has two connections: one connection for the second line 32 and one connection for the seventh line 37. The fifth inverter 402 forms a structural unit with the second electric motor 52. Functionally, the fifth 402 inverter and the second 42 inverter do not differ from each other.

The sixth inverter 403 differs from the third inverter 43 of FIG. 1 in that the sixth inverter 403 has two connections: one connection for the third line 33 and one connection for the ninth line 39. The sixth inverter 403 forms a structural unit with the third electric motor 53. Functionally, the sixth 403 inverter and the third 43 inverter do not differ from each other.

In contrast to the wind-turbine-blade-pitch system 301 of the first embodiment, the wind-turbine-blade-pitch system 303 of the third embodiment has at least one second, at least one third and at least one fourth power-storage system 701, 702, 703. With regard to function, the mentioned second, third and fourth power-storage systems 701, 702, 703 may be embodied like the first power-storage system 71 of the first embodiment of the wind-turbine-blade-pitch system 301. The second, third and fourth power-storage systems 701, 702, 703 of the third embodiment 303 of the wind-turbine-blade-pitch system 301 have the advantage that the electrical storage volume of the individual power-storage elements may be reduced. Each of the fourth, fifth and sixth inverters 401, 402, 403 thus has its own at least one second, at least one third and at least one fourth power-storage system 701, 702, 703, which means that the capacity of each of the second, third and fourth power-storage systems 701, 702, 703 does not have to be as large.

A redundancy is achieved in an advantageous manner by the fact that each first to third electric motor 51, 52, 53 is assigned its own second to fourth power-storage system 701, 702, 703, wherein, however, each first to third electric motor 51, 52, 53 may be energetically fed from each of the second to fourth power-storage systems 701, 702, 703 by the second distribution device 210.

Parts of the fourth, fifth and sixth inverters 401, 402, 403, the first to ninth lines 31 . . . 39, the second distribution device 210 and the second, third and fourth power-storage systems 701, 702, 703 thus form a shared electrical DC-intermediate circuit.

In a further embodiment of the wind-turbine-blade-pitch system, the fifth line 35, the seventh line 37 and the ninth line 39 may be omitted. The electrical energy transfer between the second to fourth power-storage systems 701, 702, 703 and the fourth to sixth inverters 401, 402, 403 is then not carried out via a direct connection, but via the second distribution device 210 and the first, or second, or third lines 31, 32, 33.

Figure 4:
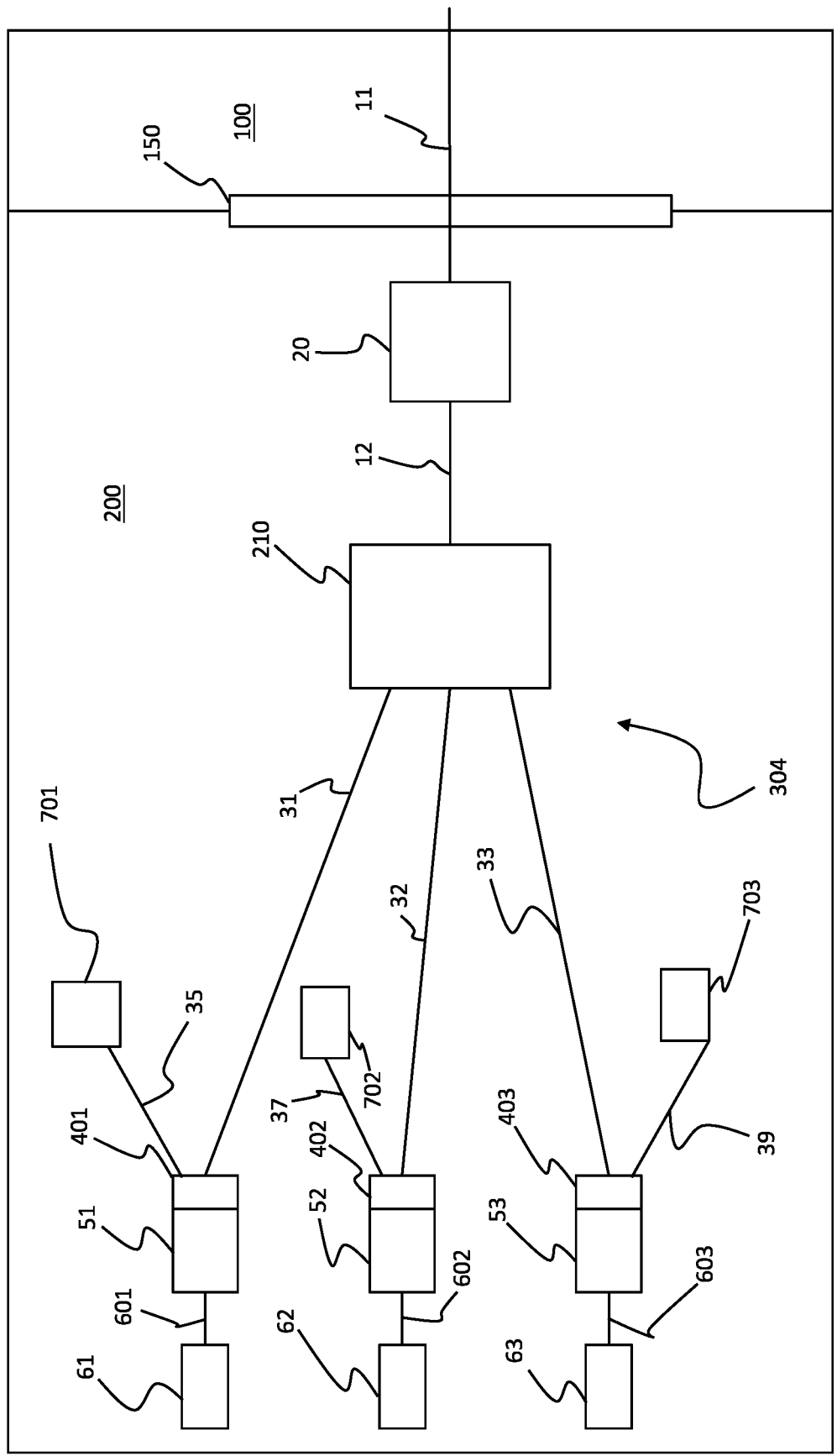
FIG. 4 depicts a principle of a fourth embodiment of the wind-turbine-blade-pitch system according to the invention.

FIG. 4 shows a basic block diagram of a fourth embodiment 304 of a proposed wind-turbine-blade-pitch system 301. The fourth embodiment 304 is very similar to the third embodiment of the wind-turbine-blade-pitch system 303 of FIG. 3. Essential components are also contained in the fourth version and therefore the differences are explained in the following.

The fifth line 35 functionally connects the second power-storage system 701 with the fourth inverter 401. A seventh line 37 functionally connects the third power-storage system 702 to the fifth inverter 402. A ninth line 39 functionally connects the fourth power-storage system 703 to the sixth inverter 403.

The first to third lines 31, 32, 33 and the fifth, seventh and ninth lines 35, 37, 39 of the fourth embodiment of the wind-turbine-blade-pitch system 304 transmit direct current to the fourth, fifth and sixth inverters 401, 402, 403 and to the at least one second, at least one third and at least one fourth power-storage system 701, 702, 703. The first to third line 31, 32, 33 and the fifth, seventh and ninth line 35, 37, 39 may provide additionally a data connection between the components mentioned, which is possible in particular by training of the mentioned lines as ETHERCAT P® line.

In contrast to the wind-turbine-blade-pitch system 303 of the third embodiment, the wind-turbine-blade-pitch system 304 of the fourth embodiment does not comprise a fourth, sixth and eighth line 34, 36, 38 between the at least one second, at least one third and at least one fourth power-storage system 701, 702, 703 and the second distribution device 210. With regard to function, the second, third and fourth power-storage systems 701, 702, 703 may be embodied like the first power-storage system 71 of the first embodiment of the wind-turbine-blade-pitch system 301 or the second, third and fourth power-storage systems 701, 702, 703 of the third embodiment of the wind-turbine-blade-pitch system 303. The second, third and fourth power-storage system 701, 702, 703 of the third embodiment of the wind-turbine-blade-pitch system 303 have the advantage that the electrical storage volume of the individual power-storage elements may be reduced. Each of the fourth, fifth and sixth inverters 401, 402, 403 thus has its own at least one second, at least one third and at least one fourth power-storage system 701, 702, 703, respectively, which means that the capacity of each of the second, third and fourth power-storage systems 701, 702, 703 does not have to be as large.

A design according to the fourth embodiment 304 of the wind-turbine-blade-pitch system 301 has the particular advantage that the second, third and fourth power-storage systems 701, 702, 703 are not influenced by each other. If, for example, one of the at least one second, at least one third and at least one fourth power-storage systems 701, 702, 703 should be unintentionally discharged due to a short circuit, this advantageously does not affect the other second, third and fourth power-storage systems 701, 702, 703, so that they may continue to supply the first, second or third electric motor 51, 52, 53 assigned to them with electrical energy in a state of emergency.

Figure 5:
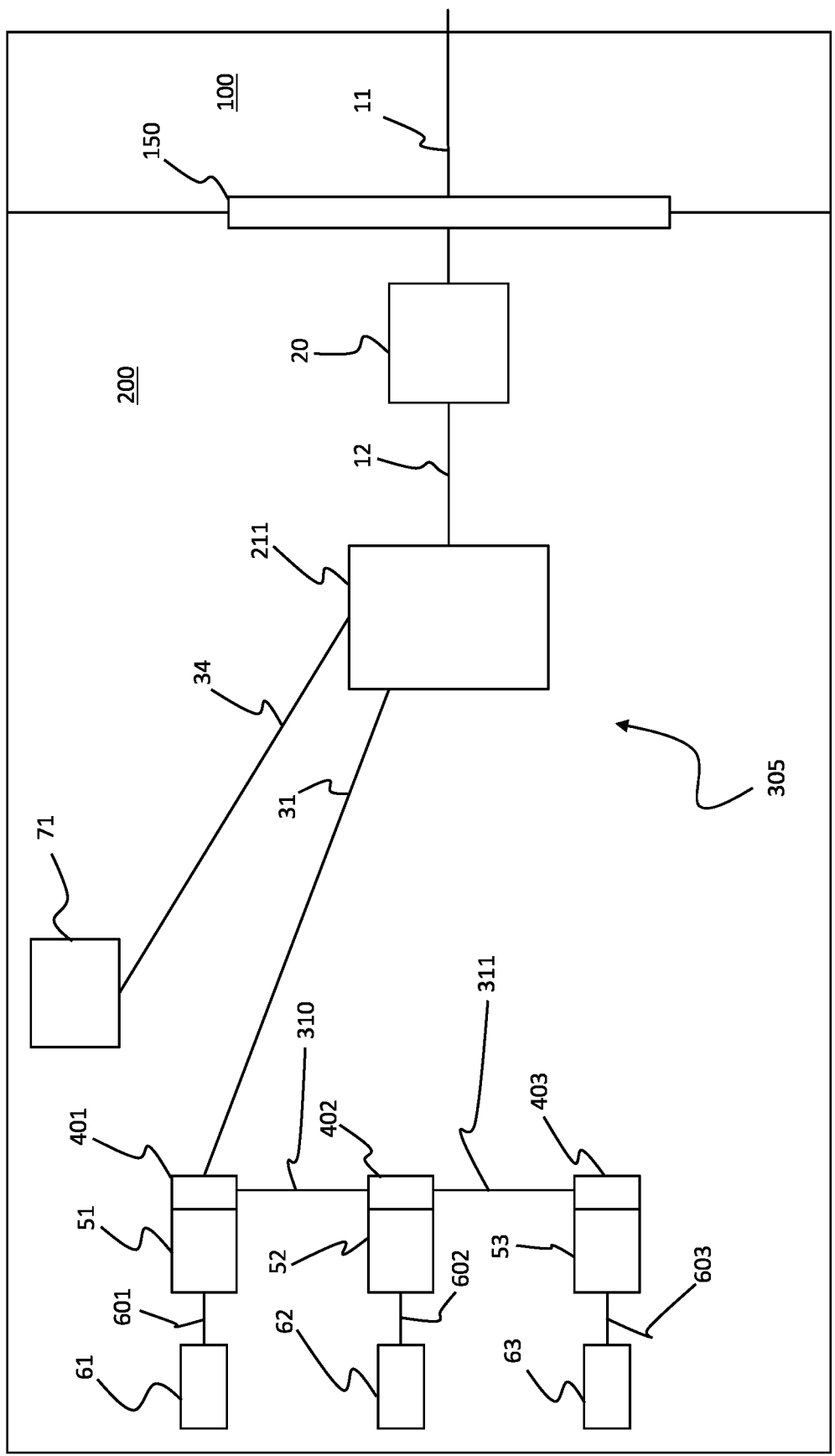
FIG. 5 shows a principle of a fifth embodiment of the wind-turbine-blade-pitch system according to the invention.

FIG. 5 shows a block diagram of a fifth version 305 of a proposed wind-turbine-blade-pitch system 301. The fifth embodiment 305 is essentially comparable to the first embodiment of the wind-turbine-blade-pitch system 301 according to FIG. 1. Many components of the first embodiment are also included in the fifth embodiment, for example the first power-storage system 71. It may be seen that the fifth embodiment includes the fourth, fifth and sixth inverters 401, 402, 403 of the third embodiment of the wind-turbine-blade-pitch system 303.

It may be seen that a third distribution device 211 comprises only three connections: one first connection for the first line 31, one second connection for the fourth line 34 and one third connection for the supply line 12.

A tenth line 310 connects the fourth inverter 401 to the fifth inverter 402. An eleventh line 311 connects the fifth inverter 402 to the sixth inverter 403. One connection of the sixth inverter 403 is not occupied and is not used. A line between the fifth 402 inverter and the third distribution device 211 may advantageously be omitted. A connection between the sixth 403 inverter and the third distribution device 211 may advantageously be omitted. The tenth and eleventh lines 310, 311 are preferably intended both for data exchange and for the transmission of electrical current between the fourth, fifth and sixth inverters 401, 402, 403 and may for this purpose e.g. be embodied as ETHERCAT P® lines.

Figure 6:
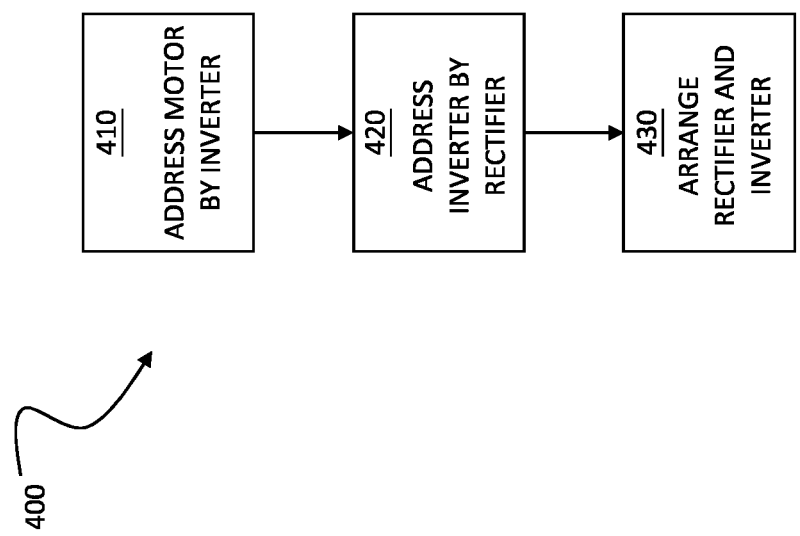
FIG. 6 shows the principle of a method for manufacturing a wind-turbine-blade-pitch system.

FIG. 6 shows a basic flow chart of a method 400 for manufacturing a wind-turbine-blade-pitch system 301, 302, 303, 304, 305.

In a first step 410, at least one electric motor 51, 52, 53, which may be addressed by an inverter 41, 42, 43, 401, 402, 403 is provided.

In a second step 420, the inverter 41, 42, 43, 401, 402, 403 is embodied to be addressable by a rectifier 20.

In a third step 430, the rectifier 20 and the inverter 41, 42, 43, 401, 402, 403 are arranged locally separated from each other in the wind turbine blade adjustment system 301, 302, 303, 304, 305.

In summary, the present invention provides an electrical rotor-blade-pitch system for a wind turbine or, respectively, a wind-turbine-blade-pitch system with a "distributed" converter. Distributing the converter allows for connecting one or a plurality of power-storage devices (e.g. batteries, capacitor banks), which are very useful as a safety feature for an emergency operation of the adjustment system or for an optimized operation.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A wind-turbine-blade-pitch system, comprising:
   a plurality of inverters,
   a plurality of electric motors, each of which is configured to be addressed by a respective one of the inverters, each respective inverter being configured to drive a corresponding electric motor configured to be addressed thereby,
   a plurality of power-storage systems, each assigned to a respective one of said inverters, wherein each power storage system is configured to supply the respective inverter with electrical energy in case of a power failure,
   wherein the inverters are configured to be addressed by a rectifier, and
   wherein the rectifier and the inverters are arranged locally separated from each other in the wind-turbine-blade-pitch system;
   wherein the rectifier is configured to supply the inverters with direct current via a power distribution device, and
   wherein the power distribution device and the plurality of power-storage systems are arranged locally separated from each other in the wind-turbine-blade-pitch system, and are functionally connected via one or more electrical supply lines, the power distribution device being connected to each power storage system via one of said one or more electrical supply lines and being configured to additionally supply any of the respective inverters with electrical energy from any of the plurality of power-storage systems that are assigned to another of the respective inverters and received via the one of said one or more electrical supply lines.

2. The wind-turbine-blade-pitch system according to claim 1, wherein each respective inverter and the electric motor configured to be addressed thereby form a physical or structural unit.

3. The wind-turbine-blade-pitch system according to claim 1, wherein each of the at least one electric motor is configured to be energetically fed via the power distribution device from at least one further power-storage system which is assigned to each of the at least one electric motor.

4. The wind-turbine-blade-pitch system according to claim 1, wherein the power distribution device is arranged externally of the rectifier.

5. The wind-turbine-blade-pitch system according to claim 1, wherein each inverter is connected to the rectifier via a line assigned to the respective inverter, via which electrical power and data are transmittable.

6. A wind turbine comprising the wind-turbine-blade-pitch system according to claim 1, wherein a slip ring is arranged in a hub or in a pod of the wind turbine, wherein electrical power and/or data for the wind-turbine-blade-pitch system are transmittable by the slip ring.

7. The wind-turbine-blade-pitch system according to claim 1, wherein each inverter comprises at least one of a current controller, a speed controller, and a position controller.

8. The wind-turbine-blade-pitch system according to claim 1, wherein:
   the at least one electric motor comprises at least three electric motors, each configured to be addressed by a respective inverter,
   each inverter is configured to be addressed by a respective rectifier, and
   each rectifier is configured to supply each respective inverter with the direct current via the power distribution device.

9. The wind-turbine-blade-pitch system according to claim 8, wherein the power distribution device is connected to each power storage system via a stand-alone electrical supply line, the power distribution device being configured to additionally supply each electric motor with electrical energy from the respective power-storage system received via the respective stand-alone electrical supply line.

10. A wind-turbine-blade-pitch system, comprising:
a plurality of electric motors each assigned to a rotor section, wherein each electric motor is configured to adjust a rotor blade of the corresponding rotor section,
a plurality of inverters each assigned to one of the electric motors, wherein each of the electric motors is configured to be addressed by a respective one of the inverters and each inverter is configured to drive the corresponding electric motor configured to be addressed thereby,
a plurality of power-storage systems each assigned to one of the inverters, wherein each power-storage system is configured to supply the corresponding inverter with electrical energy in case of a power failure, and
a rectifier which is locally separated from the inverters and configured to supply the inverters with direct current via a power distribution device, wherein the power distribution device is connected to each power-storage system and configured to supply the inverters with electrical energy from the respective connected power-storage system in the case of a power failure;
wherein the inverters are configured to be addressed by the rectifier,
wherein the rectifier and the inverters are arranged locally separated from each other in the wind-turbine-blade-pitch system,
wherein the rectifier is configured to supply the inverters with direct current via a power distribution device, and
wherein the power distribution device and the plurality of power-storage system are arranged locally separated from each other in the wind-turbine-blade-pitch system, and are functionally connected via one or more stand-alone electrical supply lines, the power distribution device being connected to each power storage system via one of said one or more stand-alone electrical supply lines and configured to additionally supply any of the respective inverters with electrical energy from any of the plurality of power-storage systems that are assigned to another of the respective inverters and received via the one of said stand-alone electrical supply lines.

11. The wind-turbine-blade-pitch system according to claim 10, wherein the wind-turbine-blade-pitch system is arranged within a hub or a pod of a wind turbine, wherein a feed-in line is guided via a slip ring from the pod to the rectifier in the hub.

12. The wind-turbine-blade-pitch system according to claim 10, wherein each inverter forms a physical or structural unit with the electric motor to which it is assigned.

13. The wind-turbine-blade-pitch system according to claim 10, wherein the power distribution device is arranged externally of the rectifier.

14. The wind-turbine-blade-pitch system according to claim 10, wherein the inverters are connected to the rectifier via at least one line, via which energy and data are transmittable.

15. The wind-turbine-blade-pitch system according to claim 10, wherein a slip ring is arranged in a hub or in a pod of the wind turbine, wherein electrical power and/or data for the wind-turbine-blade-pitch system are transmittable by the slip ring.

16. The wind-turbine-blade-pitch system according to claim 10, wherein at least one of the inverters comprises at least one of a current controller, a speed controller and a position controller.

\* \* \* \* \*